INVENTOR:
Frank L. Sessions

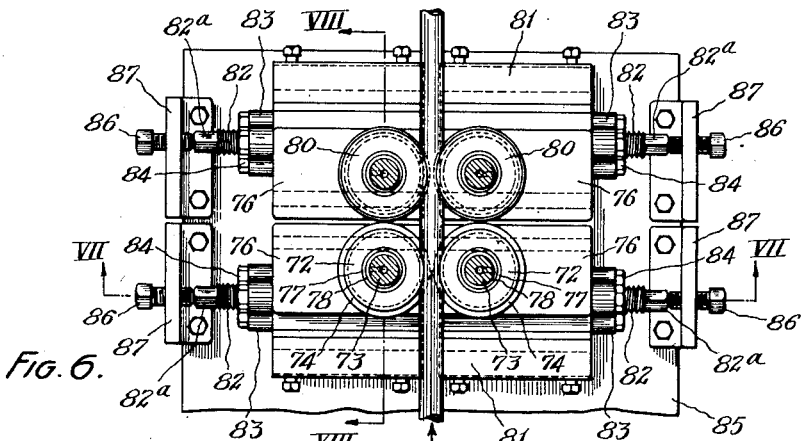
FIG. 6.
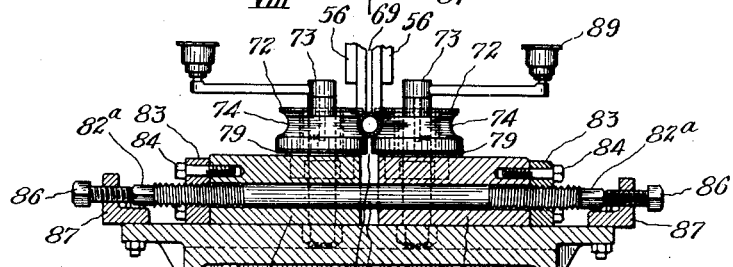
FIG. 7.
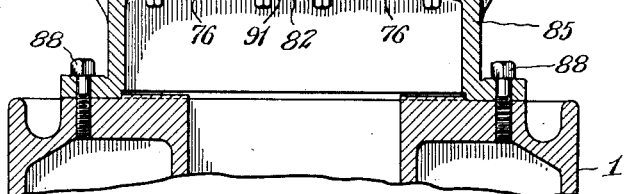
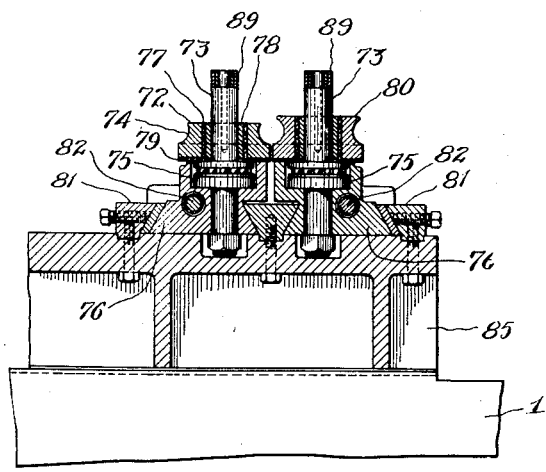
FIG. 8.

July 30, 1929.  F. L. SESSIONS  1,722,711
TUBE WELDING MACHINE
Filed Sept. 27, 1922  6 Sheets-Sheet 6

INVENTOR:
Frank L. Sessions

Patented July 30, 1929.

1,722,711

UNITED STATES PATENT OFFICE.

FRANK L. SESSIONS, OF LAKEWOOD, OHIO, ASSIGNOR TO STEEL AND TUBES, INC., OF CLEVELAND, OHIO, A CORPORATION OF OHIO.

TUBE-WELDING MACHINE.

Application filed September 27, 1922. Serial No. 500,884.

My invention relates particularly to machines for welding a longitudinal seam in tubing, the open seam tube being formed from flat strip metal stock or "skelp" either in a separate forming machine or in a tube forming apparatus incorporated in the same structure in which the welding apparatus is incorporated. My invention is particularly adapted to the welding of tubing by the electrical resistance method although some of its features, as will appear, may be advantageously used in the welding of tubing by other agents such as, for instance, the electric arc or by the so-called "gas" welding process in which an oxy-acetylene or other high temperature flame is employed as the heating agent.

Among the objects of my invention are: the provision of new and useful means for accurately positioning the seam cleft in the welding throat as the tube is progressively moved therethrough; the provision of means for varying the pressure employed to close the seam cleft; the provision of means for accurately adjusting the position of the tube transversely to the direction of its movement and in relation to the electrodes; the provision of means for exerting closing pressure upon the tube beyond the welding throat; the provision of adjustable means for accurately guiding the seam cleft into the welding throat; the provision of means for accurately adjusting the pressure of the welding electrodes upon the surface of the tube; the provision of means for varying the position of the zone of maximum side pressure relative to the zone of contact of the electrodes with the tube; the provision of an electric welding circuit free from joints and bolted contacts; the provision of means for accurately adjusting the position of the electrodes transversely to the line of movement of the tube; the provision of an improved electrode unit structure; the provision of improved means for supporting and guiding the welding transformer and electrodes above the work; the provision of means for deliberately and selectively raising and lowering the transformer and electrodes either rapidly or by micrometer adjustments; and the provision of means for cooling the secondary terminals of the transformer.

These and other objects of my invention are accomplished by the use of the mechanisms described in this specification and shown in the accompanying drawings in which—

Fig. 6 is a section drawn to a larger scale, on line VI—VI of Fig. 3.

Fig. 7 is a section drawn to a larger scale, on line VII—VII of Fig. 2;

Fig. 8 is a section, drawn to a larger scale, on line VIII—VIII of Fig. 3;

Fig. 13 is a section on line XIII—XIII of Fig. 3.

Fig. 14 is a fragmentary section on line XIV—XIV of Fig. 2.

Fig. 15 is an enlargement of a fragmentary portion of Fig. 3.

Figure 1:
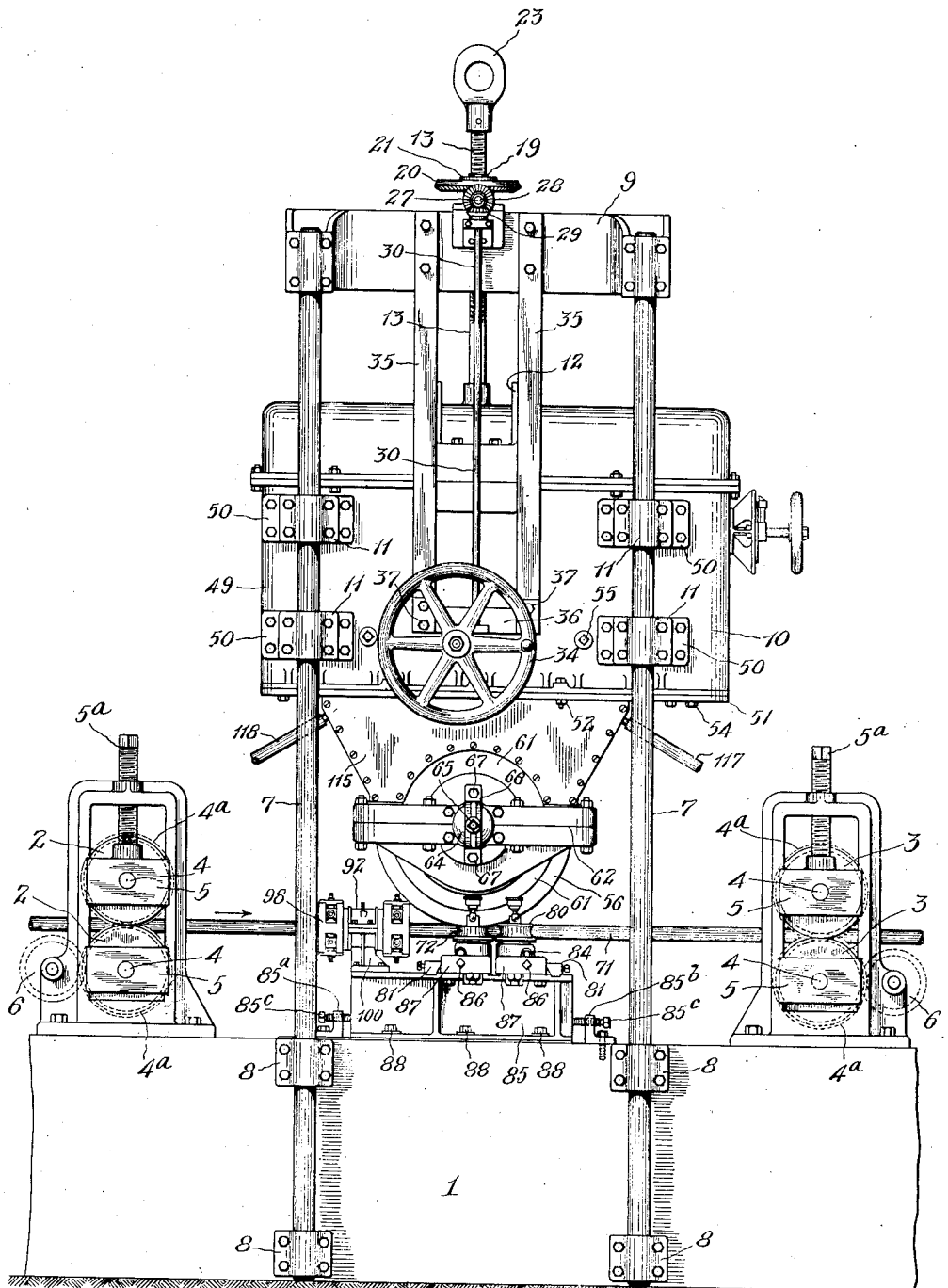
Fig. 1 is a side elevation of a tube welding machine embodying my invention.

In electric tube welding machines with which I am familiar the tube which is to be welded is formed from flat metal strip, called skelp, into butted-seam tube, the seam running longitudinally of the tube. The customary operations to be performed upon the metal strip for producing an electrically welded tube are, the forming of the strip into butted-seam tubing; the traversing and guiding of the tube through the welding throat; the welding of the seam; the removal of the welding burr from the welded seam, known as the "deburring" operation; the cooling of the welded tube; the straightening of the tube; and the cutting-off of the tube. In some practices some of these various operations are performed in separate machines while in other practices various ones of the operation are combined in a single machine. As my invention relates particularly to the welding operation and the means for accurately performing it, which includes the traversing and guiding means, I have shown in the drawings and shall describe herein in detail only those parts of the machine which are pertinent to my invention.

The preferred embodiment of my invention illustrated in the drawings is adapted to weld pre-formed, butted-seam tube whether the forming operation be performed by mechanism embodied in the welding machine or by a separate machine. In the drawings, 1 represents the base of the welding machine, which as illustrated, is provided with a pair of power driven tube feeding rolls, 2, 2, and a pair of power driven "take-off" rolls, 3, 3, carried by suitable shafts, 4, 4, mounted in adjustable bearings, 5, 5. The shafts, 4, 4, of the feed and take-off rolls may have gears, $4^a$, mounted upon them, the gears being of the same pitch diameter as the effective diameter of the rolls, and the shafts may be driven by any suitable means such, for instance, as the driving gears, 6, which may be connected to any suitable source of power. The gears, $4^a$, are preferably provided with long teeth to permit of their being adjusted towards and from each other by suitable means such as screws, $5^a$, in well known manner.

The base, 1, carries a vertical guide or support which in the machine illustrated in the drawings consists of four metal posts, 7, secured in sockets, 8, formed in the base member, 1, or suitable brackets secured thereto. The vertical guide posts, 7, are secured at their upper ends to a head frame, 9. An electric welding transformer, 10, is mounted for vertical, sliding movements upon the guide posts, 7, the transformer housing being provided with sliding bearings, 11, the weight of the transformer being supported from the head frame, 9, by a special supporting and hoisting means which permits the transformer to be quickly raised, lowered or transported by means of a separate hoist and to be raised or lowered with great nicety of adjustment when in position on the machine by means of mechanism embodied in the welding machine itself.

Secured to the top of the transformer housing preferably in a strong lifting-yoke, 12, is a threaded rod, 13. The rod, 13, may be properly secured in an aperture in yoke, 12, by means of a nut, 14, and a key, 15, the latter of which prevents the rod, 13, from turning in the aperture in yoke, 12. The threaded rod, 13, extends vertically upward from the yoke, 12, through an opening 16, in the head frame, 9. The opening, 16, is preferably keyhole shape having a cylindrical portion, $16^a$, and a slotted portion, $16^b$, the latter of which forms a passageway through which the rod, 13, may pass when the transformer is being mounted upon or removed from the guiding supports, 7. The cylindrical portion, $16^a$, of the opening, 16, is preferably accurately bored and counter bored at its upper end to form a shoulder, 17, for supporting a thrust, ball or other anti-friction bearing, 18, which in turn supports a threaded nut, 19, which is screwed upon the threaded rod, 13. The nut, 19, may be an integral part of an operating gear, 20, or it may be formed separately and secured as a bushing in the hub of the gear, 20, as shown in the drawings, by means of a nut, 21, and key, 22.

Figure 4:
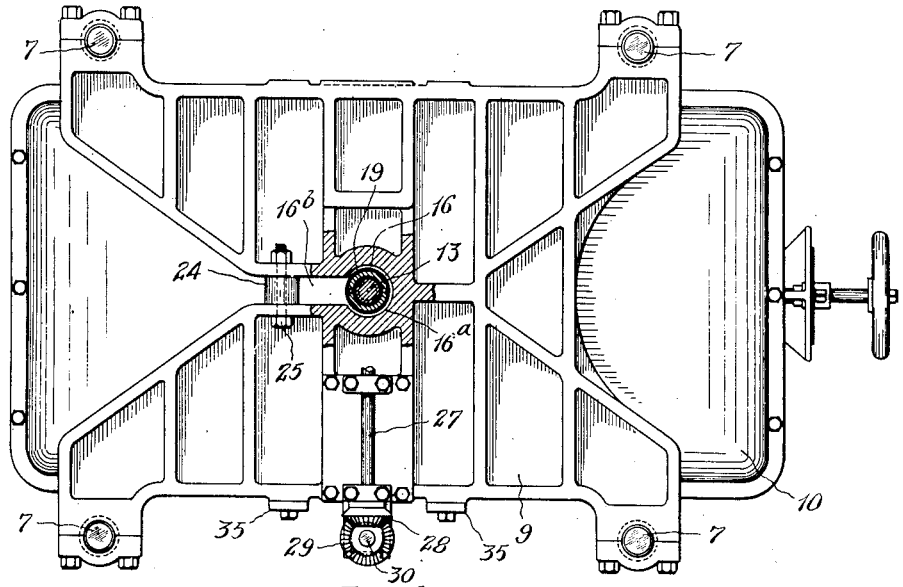
Fig. 4 is a section on line IV—IV of Fig. 2.
Figure 5:
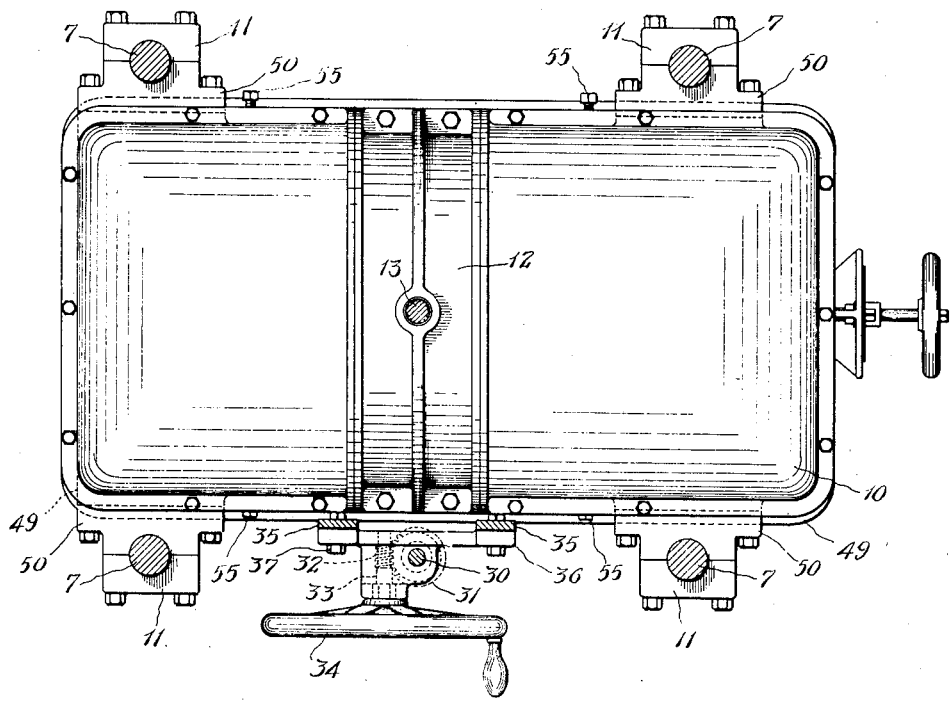
Fig. 5 is a section on line V—V of Fig. 2.
Figures 9, 11:
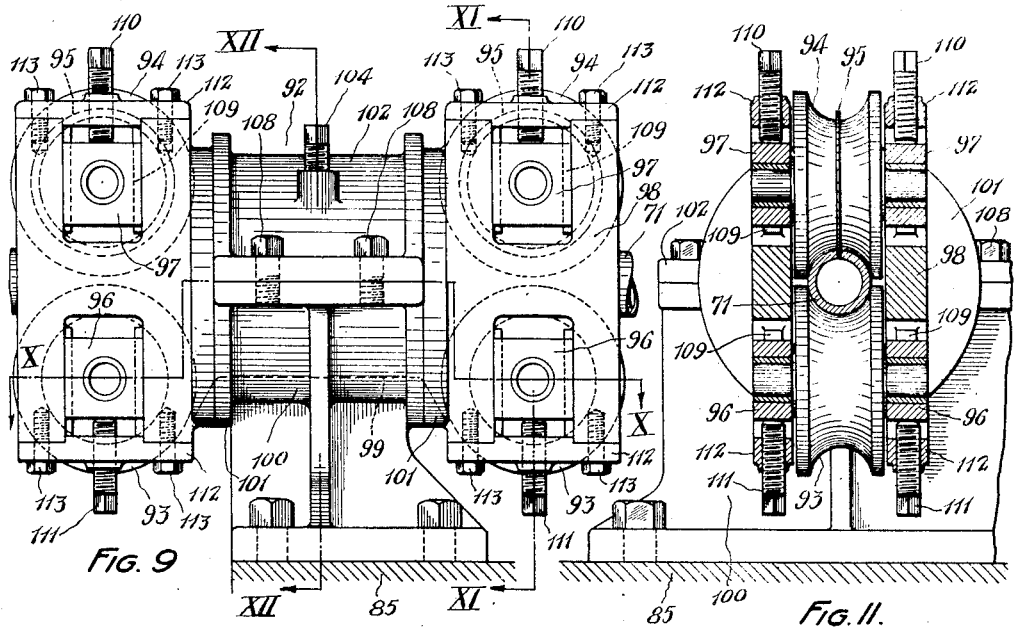
Fig. 9 is a side elevation of the seam guide drawn to an enlarged scale.
Figs. 11 and 12 are vertical cross-sections of the seam guide on lines XI—XI and XII—XII respectively of Fig. 9.
Figures 10, 12:
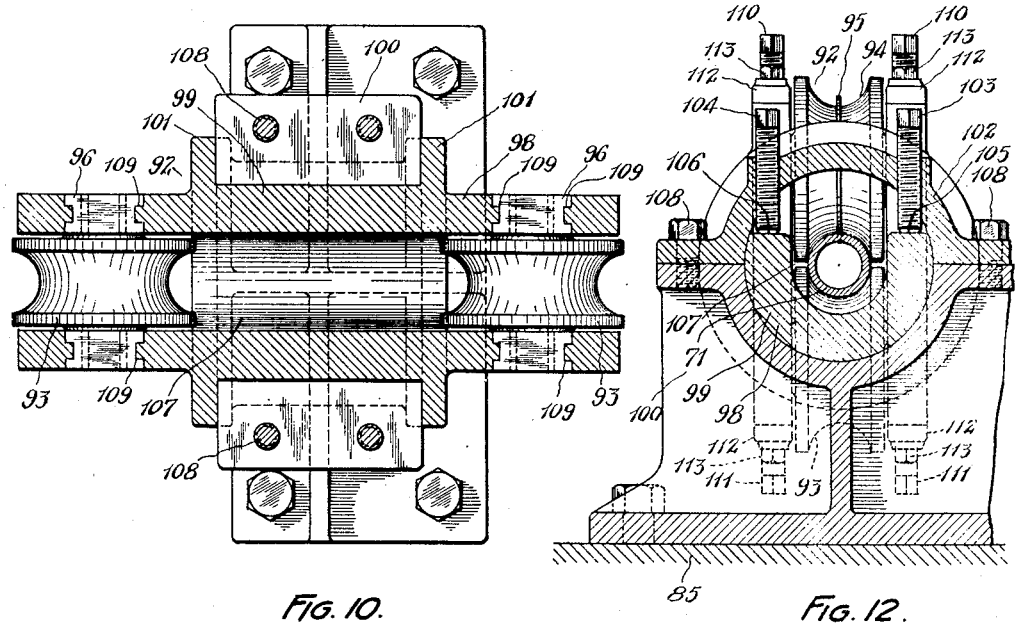
Fig. 10 is a plan section of the seam guide on line X—X of Fig. 9 the tubing being omitted for sake of clearness.

The upper portion of the rod, 13, preferably extends above the gear, 20, a sufficient distance to provide for all of the vertical adjustment of the transformer that will be required when it is in use and a lifting eye, 23, is preferably secured to the upper end of the rod, 13. By means of the lifting eye and its connection by rod, 13, to the transformer, 10, the latter may be handled by a crane or other hoisting device when it is being assembled on or removed from its guide supports, 7. To strengthen the head frame, 9, after the transformer is in place, a spacing-block, 24, may be secured in the slot, $16^b$, by means of bolts, 25, as shown in Fig. 4.

To rotate the nut, 19, for raising or lowering the transformer, 10, upon its supports and guides, 7, for the purpose of accurately adjusting the electrodes vertically, I prefer to employ the mechanism shown in the drawings in which 20 is a bevel gear adapted to be rotated by means of a bevel pinion, 26, secured to a shaft, 27, which in turn is rotated by means of a pair of bevel pinions, 28, 29. Pinion, 29, is secured to a vertical shaft, 30, which carries at its lower end a worm wheel, 31, which meshes with a suitable worm, 32, carried by a shaft, 33. The shaft, 33, has secured to it a hand wheel, 34. Rotation of the hand wheel in one direction will raise the transformer and in the other direction will lower the transformer by reason of the movement of the hand wheel being transmitted through the above described worm and bevel gear connections to rotate the nut, 19. The shaft, 33, is preferably supported in bearings carried in a frame secured to the head frame, 9. This supporting frame for the shaft, 30, may conveniently be made by bolting bars, 35, to the head frame, 9, and providing a suitable bearing-support, 36, for shaft, 33, at the lower end of the bars, 35. The bearing-support, 36, may be secured to bars, 35, in any suitable manner as by means of the bolts, 37, and may be provided with suitable bearings for the shafts, 30 and 33, as shown in the drawings.

It will be observed that by means of the worm gear and bevel gear reductions between the hand wheel, 33, and the nut, 19, extremely small, vertical, adjustments of the position of the transformer upon its guide supports may be effected. This is an important feature of my invention which will be further explained in this specification.

Figure 3:
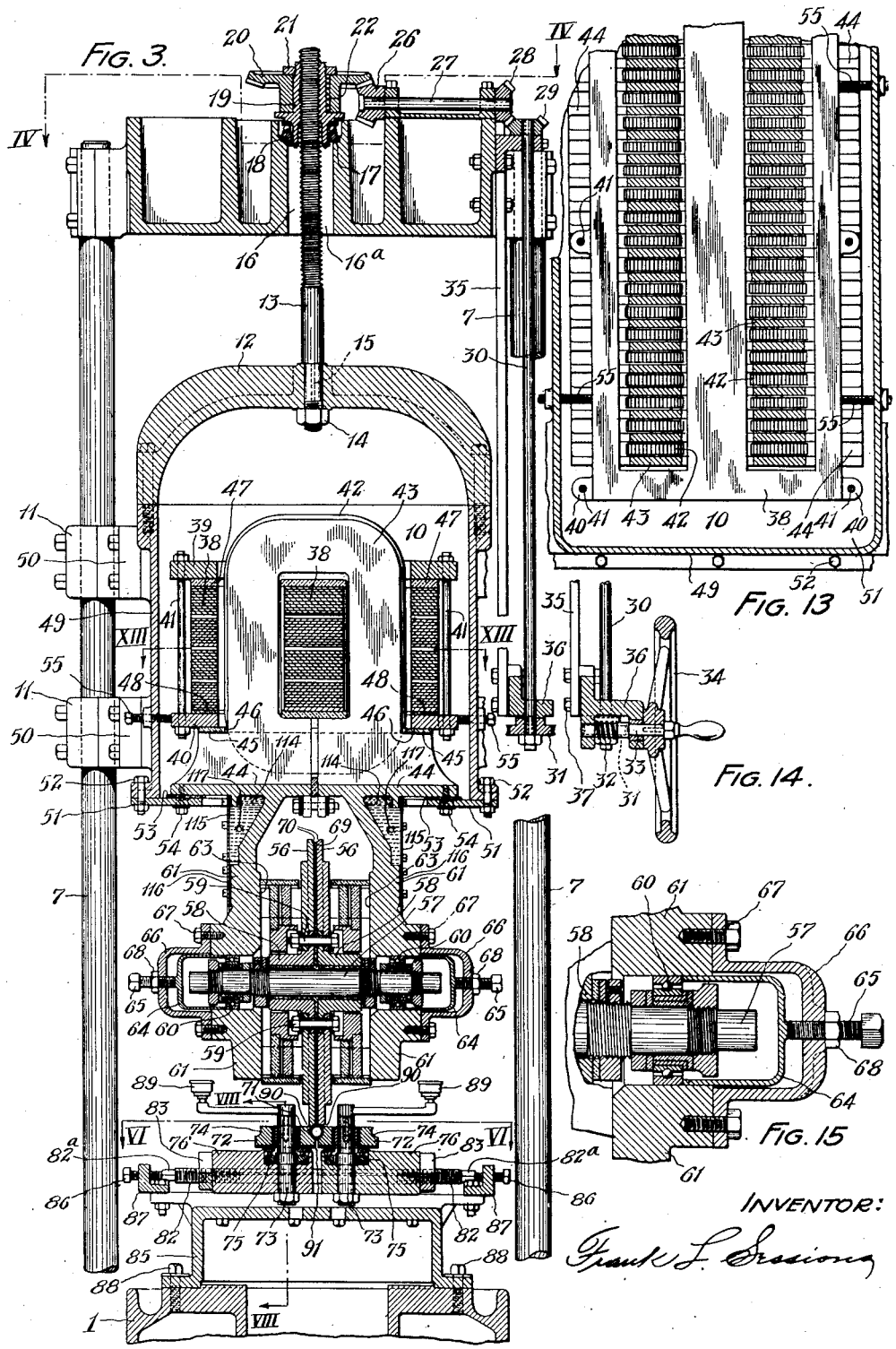
Fig. 3 is a section on line III—III of Fig. 2.

The transformer structure includes the laminated core, 38, which is clamped together by means of clamps, 39 and 40, and bolts, 41. The primary windings, as shown in Figs. 3 and 13 are divided into separate coils, 42, which are sandwiched between loops 43, of the secondary winding. In the transformer shown in the drawings a one-turn secondary is employed and I prefer to form this secondary by casting it in a single integral casting and by dividing the inductor portion of the secondary into separated loops in order to permit of a better distribution of the primary windings between the sections of the secondary inductor; to provide better ventilation; to provide a secondary winding without electrical joints; to reduce the expense of manufacture; to facilitate assembling the transformer; to provide a transformer of such shape as will be best adapted to the design of the welding machine; and to provide a transformer having suitable electrical and magnetic characteristics for properly doing the work it has to perform.

The sectional secondary loops, 43, of the transformer secondary are cast integrally with the bus-bar portions, 44, and are provided with seats, 45, forming supports for the core, 38. Suitable insulating plates, 46, may be provided for insulating the transformer secondary from the core clamping plate, 40. The core clamping plates, 39 and 40, may be insulated and magnetically disconnected from the core by means of insulating plates, 47 and 48.

I prefer to mount and support the transformer in a housing, 10, composed of a shell or body, 49, to which bearing blocks, 50, are secured, these bearing blocks having accurately bored bearing apertures, 11, in which the rods, 7, have sliding fits. The transformer housing is thus securely supported and accurately guided in its vertical movements. The transformer proper is supported in the housing, 10, by means of a metal plate, 51, secured to the lower flanges of shell, 49, by means of bolts, 52. The plate, 51, extends inwardly from the shell, 49, forming a flange which supports the transformer. The bus-bar portions, 44, of the transformer secondary rest upon insulations, 53, upon plate, 51, and are secured thereto by means of cap screws, 54, which are insulated from plate, 51.

For positioning the transformer proper in the shell, 49, I prefer to provide set screws, 55, which are screwed through threaded apertures in the shell, 49, and have their ends bearing against the sides of core clamping plate, 40. The provision of four of these set screws, placed at the respective four corners of the transformer enables the transformer core and consequently the electrodes to be accurately aligned with the machine in an obvious manner. To permit of such alignment the holes in plate, 51, through which the insulated cap screws, 54, pass may be made somewhat larger than the diameter of the insulating bushings which surround the cap screws, 54. The welding electrodes, 56, are mounted upon but insulated from a shaft, 57, which I prefer to make of non-magnetizable material such for instance, as phosphor bronze. As will be seen in Fig. 3, the electrodes, 56, are detachably secured to flanged hub members, 58, by means of insulated bolts, 59. The flanged hub members, 58, are insulated from each other and from the shaft, 57, upon which they are securely mounted for rotation therewith. The electrode members, 56, it will be observed, may thus be made interchangeable so that electrodes grooved for welding different sizes of tubes may be readily substituted, one set for another, upon the flanged hub members, 58, or, worn out electrodes may be readily replaced by new ones.

The electrode unit comprising the insulated electrode members, 56, and the shaft, 57, with the intervening insulations and securing members is preferably mounted in ball or other anti-friction bearings, 60, which are secured in depending secondary terminal members, 61, which extend downwardly from the secondary bus bar members, 44, and are preferably cast integrally therewith. Bearings, 60, are preferably insulated from the shaft, 57, and are so shown in the drawings but it will be apparent to those skilled in the art that the bearings, 60, may be mounted in uninsulated relation to the shaft, 57, provided they be insulated from the terminal members, 61. The terminal members, 61, are preferably divided in a horizontal plane, 62, through the axis of shaft, 57, and have their inner opposed faces, 63, accurately finished for the purpose of making good electrical contact with the current collecting devices which conduct current from the stationary terminals, 61, to the revoluble electrodes, 56.

I prefer to employ current collecting devices like those shown and described in my application for Letters Patent Serial No. 434,706 filed January 3rd, 1921 (Patent No. 1,433,852) in which the brushes extend obliquely across the spaces between each electrode, 56, and the opposed face, 63, of the secondary terminal, 61, and make edge contact at one end with the secondary terminal and at the other end with the electrode, suitable means being provided for making pressure between the brushes and the opposed contact surfaces and for compensating for their wear. Any other suitable means may be provided for conducting the current from the secondary terminals, 61, to the electrode members and in the broad aspects of my invention I do not limit myself to any particular brush collecting means nor to any particular form of electrode, as, it will be apparent to those skilled in the art, that cylindrical hubs may be formed upon the electrodes and radial or tangential brushes such as those shown in Patent 1,338,434, issued August 23, 1921 to Gustav V. Johnston may be employed if desired.

For adjusting the electrodes transversely of the work being welded I prefer to provide thrust sleeves such as those shown at 64 which are adapted to bear against the non-rotating members of the anti-friction bearing, 60, and to be adjusted in position by means of set screws, 65, which are threaded through brackets, 66, secured to the terminal members, 61, by means of bolts, 67. It will be seen that by loosening one of the set screws, 65, and tightening the other, the shaft, 57, and consequently the electrodes, 56, may be accurately adjusted in position transversely to the line of direction of movement of the tubing being welded. When in proper adjustment jam nuts, 68, may be tightened to prevent accidental change of the adjustment. In the event that it should be desired to permit the electrodes to "float" that is to say, to move transversely to the tube being welded in order to follow a tube which may not be perfectly straight, the set screws, 65, may be unscrewed sufficiently to provide the necessary clearance for end play of shaft, 57.

The electrode rolls, 56, are separated from each other by a narrow space, 69, and are grooved adjacent to this space, as shown at 70, to fit the surface of the tube being welded. The tube which constitutes the work being welded is shown at 71. For supporting the tube below the electrodes, 56, and for pressing the sides of the tube inward as it passes through the welding throat, I prefer to provide supporting and side pressure rolls, 72, which are free to revolve about their axes upon studs or spindles, 73. The rolls, 72, are provided with grooves, 74, properly shaped to most effectively support the tube and press its sides together in a manner which will, with the coaction of the electrodes, 56, make an efficient weld when the walls of the seam cleft are properly heated. The rolls, 72, rest upon ball or other anti-friction thrust bearings, 75, which together with the studs, 73, are mounted in adjustable slides, 76. The rolls, 72, are preferably insulated from the studs, 73, and from the bearings, 75, in the following manner as best shown in Fig. 8. The bearing aperture in the roll is made larger than the diameter of the stud, 73, and is lined with an insulating bushing, 77. The insulating bushing, 77, in turn may be lined with a bearing metal bushing, 78. The roll, 72, is thus insulated from the stud, 73. Between the roll, 72, and its supporting bearing, 75, is a plate or disk, 79, of insulating material which, together with the insulating bushing, 77, completely insulates the rolls, 72, from each other and from the rest of the machine. It will be understood that either one or both of the rolls, 72, may be insulated in the manner described. By thus insulating the supporting and side pressure rolls, loss of energy from the short-circuiting of current around the welding zone is avoided but I would have it understood that this insulation of the supporting and side pressure rolls is not essential to the successful welding of tubing as many hundred thousand feet of tube have been successfully welded in machines built in accordance with my invention in which the supporting and side pressure rolls were not so insulated but had direct metal contact both with the studs, 73, and bearings, 75.

As it is possible to weld tubing at a high rate of speed in a machine built in accordance with my invention I have found it desirable to provide means for maintaining the side pressure upon the tube after it has passed through the welding throat until the welded seam has cooled and hardened sufficiently to withstand any force which may tend to open it. For this purpose I prefer to provide one or more pairs of side pressure rolls, 80, which may be mounted in a similar manner to the supporting and side pressure rolls, 72, and be provided with the same kind of adjustments. It will be observed that the rolls, 72, are not as high as rolls, 80, for the reason that the former stand at the welding throat and have to be made lower to provide room for the electrodes which make contact with the surface of the tube over considerable arcs of its circumference.

I have found it desirable to provide means for varying the distance between the members of a pair of supporting or side pressure rolls and also to provide means for moving both rolls simultaneously in the same direction transversely to the tube being welded. To accomplish these adjustments I mount the sliding members, 76, in guides, 81, for movements transverse to the tube and provide means for adjusting the members of each pair of rolls, towards and from each other, consisting of a rod, 82, threaded at one end with a right hand thread and at the other end with a left hand thread, the threaded portions engaging nuts, 83, which are secured to the slides, 76, by means of screws, 84. It will be apparent, however, that instead of employing separate nuts, 83, bolted to the slides, the nuts may be dispensed with if suitable threaded apertures are provided in the slides, 76. The ends of rod, 82, are preferably squared as shown at 82ª, for the reception of an operating wrench. The slides, 76, are preferably supported upon a plate, 85, which in turn is supported upon the bed plate, 1, of the machine. The slides, 76, and plate, 85, are preferably made of non-magnetizable material in order to keep down the inductance of the welding circuit.

To move the supporting and side pressure rolls simultaneously in the same direction transverse to the tube, set screws, 86, may be provided which are screwed through brackets, 87, which are preferably detachably secured to plate, 85. The ends of set screws, 86, engage the ends of rod, 82, and it will be apparent that by loosening one of the screws and tightening the other, the slides, 76 and consequently the rolls, 72, will be moved in the same direction transverse to the tube.

I have found it desirable to be able to position the supporting and side pressure rolls, 72, slightly out of the plane of contact of the electrodes with the tube and for this purpose I prefer to secure the plate, 85, to the base, 1, by means of bolts, 88, and to provide elongated, slotted holes in plate, 85, to permit it to be so set as to position the rolls, 72, in relation to the electrodes, 56, where desired. Suitable means, such as the brackets, 85ª and 85ᵇ, and set screws 85ᶜ (Fig. 1) may be employed for effecting the adjustment of plate, 85, in an obvious manner.

For lubricating the bearings of the rolls, 72, upon studs, 73, I prefer to provide grease or oil cups, 89, which are screwed upon the studs, and supply lubricant through suitable apertures. By off-setting the grease cups, 89, as shown in the drawings, greater clearance is provided between the tops of the studs, 73, and the secondary terminals, 61, of the transformer than would be possible if the grease cups were mounted directly upon the ends of the studs. This is a desirable feature as the electrodes, 56, are gradually worn smaller in diameter by use and the transformer has to be lowered towards the tube to compensate for this wear.

It will be seen in the drawings that a substantially closed welding throat is formed by the grooves in the supporting rolls, 72, and the grooves in the electrodes, 56. The openings in the otherwise closed wall of the passage or welding throat through which the tube passes, are the space, 69, through which space the seam cleft passes between the electrodes, the spaces, 90, between the electrodes and supporting rolls, 72, and the space, 91, between the supporting rolls, 72. These several spaces are preferably made small so that the tube is subjected to circumferential pressure on substantially its entire periphery in the welding throat. It will be understood that the electrodes, 56, must not contact with the supporting and side pressure rolls, 72, or 80, otherwise the welding current would be short circuited. But it will also be understood that as the voltage of the welding circuit is small (I have found in practice 1½ to 6 volts to be sufficient) the actual clearances between the electrodes and the other parts of the machine from which the electrodes must be insulated may be very small.

It has already been mentioned that the provision of extremely small, selective, vertical adjustments of the transformer and the electrodes, 56, is an important feature of my invention. It will be readily understood that when tubing is being traversed through the machine at a speed of from 60 to 90 feet per minute or even greater speed, that there must be extremely accurate correlation of the factors which make possible a continuous, efficient weld. Among these factors are the side pressure upon the seam cleft, and the volume of current flowing across the seam cleft. As the resistance of the seam cleft and the resistance of the contact between the electrodes and the tube constitute the major portion of the electrical resistance of the circuit through which the welding current passes and as these resistances are substantially the only variable resistances in the welding circuit it follows that if one or both of these resistances can be varied at will, the volume of current in the circuit can also be varied since it is supplied at practically constant potential. I have found that variation of the pressure between the contacting edges of the tube at the seam cleft and variation of the pressure of the electrodes upon the tube both have a marked effect upon the volume of current flowing through the circuit. By means of the extremely small vertical adjustments of the electrodes for which I have made provision, I am enabled to vary and control not only the contact pressure between the electrodes and the tube but, by the coaction of the supporting and side pressure rolls, to also vary the pressure between the edges of the tube at the seam cleft. It will be apparent that downward pressure of the electrodes upon the top surface of the tube will tend to flatten the tube and widen it in the welding throat. This widening effect will however, be resisted both by the supporting rolls, 72, and the encompassing grooves in the electrodes, 56, and will react to increase the pressure between the edges of the tube at the seam cleft. As noted above the downward pressure of the electrodes upon the top surface of the tube will tend to flatten and widen the tube in the welding throat. It is obvious that this will result in increasing the area of the contacting surfaces of the electrodes upon the tube.

So far as I am aware it has not heretofore been proposed to control the volume of current flowing in a welding machine of the class described by varying the contact pressure between the electrodes and the work during the welding operation. With my invention it is possible to do this with great accuracy while the tube is in motion and the welding current is flowing. The value of this feature of my invention can be realized from a consideration of the following facts: (1) It is known that the electrical resistances of the contact between electrodes and the tube and between the contacting edges of the seam cleft constitute the major portion of the resistance of the welding circuit. (2) On account of the extremely large current required for welding, the conductors for transmitting the welding current are so massive that it is impracticable if not indeed impossible to vary the resistance of the welding circuit by heretofore known resistance varying devices. (3) For these reasons it heretofore has been the practice to rely wholly upon a variation of the potential of the welding circuit for varying the welding current.

My invention adds the very desirable feature of varying the current by varying the pressure and thereby varying the contact resistance of the electrodes upon the tube. This of course does not preclude the variation of the potential of the welding circuit which method of current control may be and preferably is used in conjunction with the contact pressure variation referred to.

Among the advantages of controlling the current by means of the variation in contact pressure are:

1. There is no loss of energy from such a method of control. The greater or lesser heat required results directly at the welding point from the change of pressure effected.

2. There is no change whatever in the power factor of the welding current.

3. There is no change in the impedance of the welding circuit excepting at the welding point, between the electrodes.

4. The simultaneous and practically micrometric adjustment of the electrodes provided in this machine, and which is due to the unitary construction of the electrode unit, does not change the alignment and has very little effect upon the register of the meeting edges within the range of adjustment necessary for making a material change in the current flow. When variations of current of considerable magnitude are desired, the usual methods of regulation are first used, and the method of this invention for closer adjustment.

5. All other methods of regulating welding current involve variations in the power factor of the welding circuit or energy losses in transformation, neither of which result from regulating the current by varying the pressure of the electrodes in accordance with the present invention.

By localizing the variable factors, or "variables" of the welding circuit within a small area including the edges or surfaces being welded, a more effective control of the weld is obtained. The variable factors of the welding circuit that are localized within a small area including the welding point comprise—the welding current, the areas of contact between the electrodes and the work, the pressure of the electrodes upon the work, the pressure of the contacting seam surfaces upon each other and the areas of the seam surfaces that are in contact with other. The rate of travel of the work being welded has an influence upon the co-ordination of the other factors, but the rate of travel is not necessarily affected by varying the electrode pressure.

For guiding the seam cleft into the welding throat so that it will be accurately positioned midway between the electrodes, I prefer to use the device shown at 92 in Fig. 1 of the drawings and in detail in Figs. 9, 10, 11 and 12. In this device the tube, 71, passes between one or more pairs of opposed grooved rollers, 93, 94, the roller, 93, having a smooth groove adapted to fit the wall of the tube blank while roller, 94, is provided at its center with an annular metal fin, 95, which is adapted to enter the seam cleft. Preferably the roller, 94, is made in two similar parts and the part, 95, is a metal disc clamped between them, as clearly shown in Figs. 11 and 12.

The rollers, 93 and 94 are supported in adjustable bearings, 96, and 97 respectively which bearings are carried by a rocking head or turret, 98. The rocking member, 98, has a cylindrical portion, 99, which rests in a support, 100, preferably mounted upon the plate, 85, in order that the seam guide may be as close as possible to the electrode throat. It will be understood that the seam cleft in the formed tube blank is sometimes not straight but is somewhat in the form of a spiral of extremely long pitch. This is due to the uneven straining of the tube blank when it is being formed from the flat strip into an open seam tube. For this reason it is desirable that the seam guide be as close to the welding throat as possible in order that the tendency of the seam cleft to resume its spiral form after having passed through the seam guide may not throw the seam cleft out of its central position between the electrodes in the welding throat.

The rocking head, 98, is preferably provided with flanges, 101, which abut against corresponding flanges upon the bracket, 100, and the bracket cap, 102. The adjustment of the the seam guide for the purpose of controlling the position of the seam cleft is effected by rocking the turret member, 98, in its bearing in bracket, 100. To accomplish this adjustment I prefer to provide opposed set screws, 103, 104, which are screwed through suitable apertures in the cap, 102, and bear against the rocking member, 98, upon opposite sides of the tube at 105, 106. By loosening one of the set screws, 103 or 104 and tightening the other the member, 98, may be rocked about its center and the guiding fins, 95, in the seam cleft of the tube will twist the tube about its axis to any extent desired.

It will be understood that the rolls, 93 and 94, are preferably grooved to suit the size of the tube which is being welded in order that accurate adjustments of the seam cleft may be maintained. To facilitate changing the rolls, 93 and 94, I prefer to provide the removable cap, 102, for the bracket, 100, and to provide an open slot 107, in the rocking member, 98. For the same purpose I prefer to make provision for the bodily removal of the bearing members, 96 and 97, from their supports in the rocking member, 98. Figs. 9, 10, 11 and 12 clearly show these provisions in which the cap, 102 is secured to the bracket, 100, by means of cap screws, 108, the bearings 96 and 97 are shown supported upon slides, 109, and the adjustments of the bearings 96 and 97 as being accomplished by means of opposed set screws, 110, 111, which are threaded through tie plates, 112, which span the openings for the bearings, 96 and 97 and are secured to the member, 98, by means of cap screws, 113.

It will be seen that by removing the cap, 102, the plates, 112 and the rolls, 94, the rocking head, 98, may be rotated 180° and lifted out of its bearing in the bracket, 100, without disturbing the tube. While I have shown no provision for lubricating the bearings of the rolls, 94, it will be understood that any well known provision may be made for this purpose.

I am aware that it heretofore has been proposed to guide the seam cleft of the tube blank in a welding machine by means of a roller provided with a pin such as my members, 94 and 95, and a complemental roll such as my roll, 93, but so far as I am aware, no provision heretofore has been made for separately removing and replacing or changing these guiding members or for adjusting the complemental rolls, 93 and 94 towards and from each other.

Figure 2:
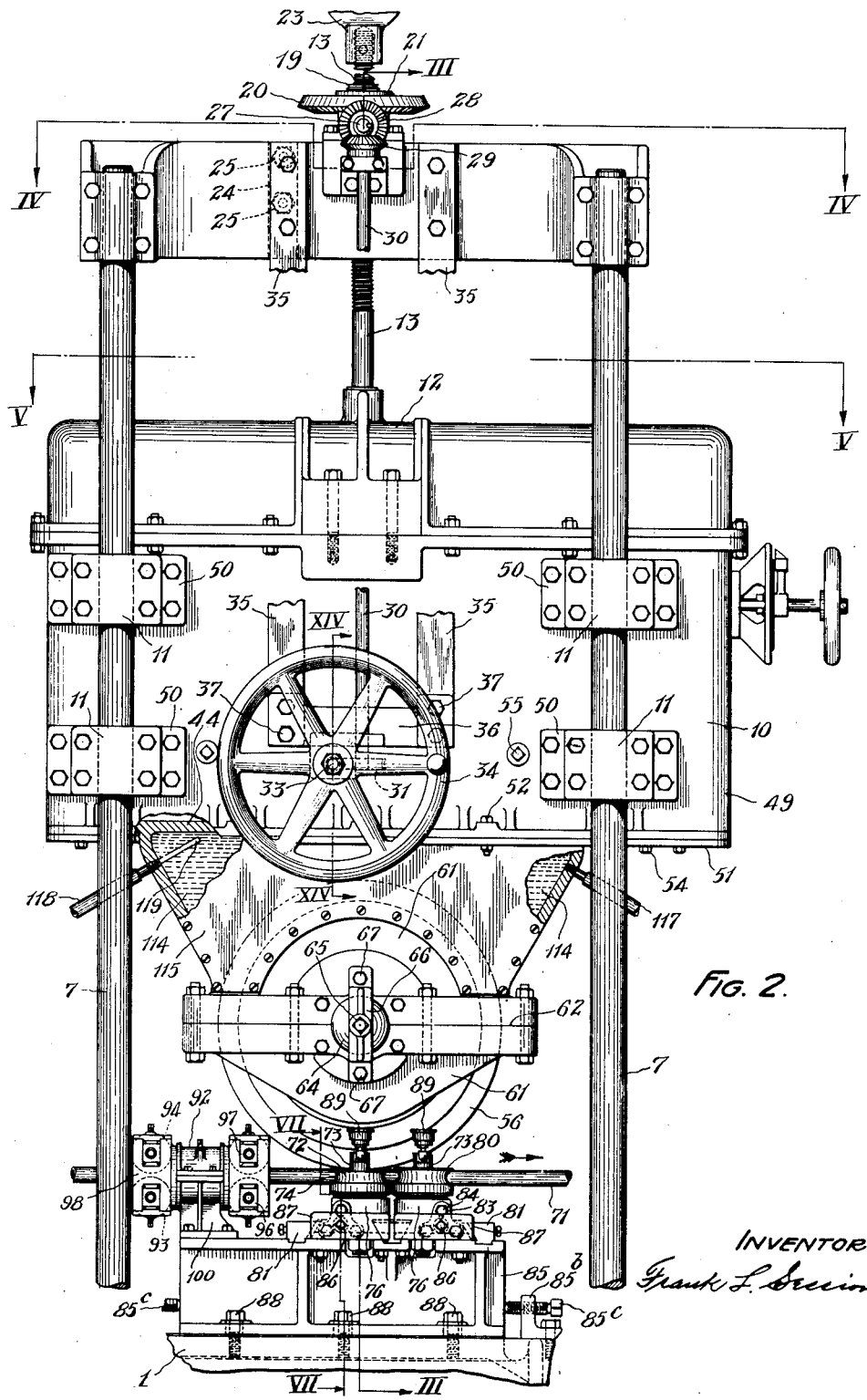
Fig. 2 is a fragmentary side elevation drawn to a larger scale of a portion of the machine shown in Fig. 1.

For cooling the secondary terminals of the transformer, recesses, 114, may be provided which may be closed by plates, 115, and gaskets, 116, to form chambers or jackets through which cooling water or other fluid may be circulated. Inlet and outlet connections such as the pipe connections, 117 and 118, respectively, may be provided and the cooling fluid may be caused to pass through the jackets from any convenient source in known manner. I have found it best to arrange the outlet opening at the extreme top of the jacket and for this purpose the outlet tube may be inserted into the outlet to within close proximity to the top of the jacket as shown at 119, Fig. 2.

The use of non-magnetic material in shaft, 57, hub members, 58, slides, 76, plate, 85, and other parts in close proximity to the welding circuit, minimizes the magnetic induction of the welding circuit and prevents the reduction of its power factor. This is desirable not only because the regulation of the power circuit to which the primary winding of the welding transformer is connected is less affected by the making and breaking of the welding circuit than it would be were there large masses of magnetic material close to the welding circuit, but, also because the regulation of the welding current is more constant.

I claim as my invention:—

1. The method of controlling the variable electrical resistance of the welding circuit in progressive, electric, butt-seam welding, which comprises selectively varying, during the welding, the constantly applied and otherwise uniform contact pressure between the electrodes and the work.

2. The method of controlling the variable electrical resistance of the welding circuit in progressive, electric, butt-seam welding, which comprises controlling the contact area of the electrodes upon the work by selectively varying, during the welding, the constantly applied and otherwise uniform contact pressure between the electrodes and the work.

3. The method of controlling the volume of current flowing in an electric, butt seam-welding circuit which consists of varying the resistance of the contact of the electrodes with the work by varying the pressure of the electrodes on the work.

4. The method of controlling the volume of current flowing in an electric, butt seam-welding circuit which consists of varying the resistance of the contact of the electrodes with the work by varying the area of the electrodes upon the work through a variation of the pressure of the electrodes on the work.

5. In electric, seam-welding apparatus, the combination with an electric circuit, of two electrodes connected respectively to the opposite terminals of said circuit and adapted to make electrical contact with the work upon respectively opposite sides of the seam being welded, means for supporting said electrodes above the work, said means including a lifting screw and nut one of which is supported upon a stationary support, and means for causing relative rotation of said screw and nut for the purpose described.

6. In electric, seam-welding apparatus, the combination of a transformer, electrodes supported by and electrically connected to the terminals of said transformer adapted to make contact with upwardly presented surfaces of the work to be welded, means for supporting said transformer including a lifting screw and a nut therefor, and means for causing relative rotation of said screw and nut for the purpose described.

7. In electric seam-welding apparatus, a pair of electrodes adapted to make contact with the work upon respectively opposite sides of the seam being welded, means for causing relative seam-traversing movement of the electrodes and the work, adjustable work-supporting and guiding means engaging the work on both sides of the seam and adapted upon adjustment in either direction transversely to said seam traversing movement positively to move the work in the direction of said adjustment relative to said electrodes, and means for adjusting said work-supporting and guiding means transversely to said electrodes.

8. In apparatus for welding tubing, the combination with tube-traversing and seam-guiding means, of means for progressively heating the edges of the seam-cleft of the tube at one place in the path of its movement, means for progressively compressing the tube circumferentially in the plane of said place whereby the seam-cleft is welded, a pair of grooved, side-pressure rolls adapted to engage the welded tube at a point closely adjacent to but removed from said place in the direction of movement of the tube, and means for adjusting said side-pressure rolls to vary their pressure upon the tube.

9. In apparatus for electrically welding tubing the combination with tube-traversing and seam-guiding means, of a pair of electrodes adapted to make contact with the tube upon respectively opposite sides of the seam-cleft, means for supporting the tube in contact with said electrodes and means for adjusting the position of said tube supporting means in the direction of movement of the tube.

10. In apparatus for electrically welding tubing, the combination with tube-traversing and seam-guiding means, of a pair of electrodes adapted to make contact with the tube upon respectively opposite sides of the seam-cleft, means for supporting the tube in contact with the electrodes, said means including a roller having a groove adapted to engage the tube in supporting relation thereto and means for varying the position of said grooved roller in the direction of movement of the tube.

11. In apparatus for electrically welding tubing, the combination with tube-traversing and seam-guiding means, of a pair of electrodes adapted to make contact with the tube upon respectively opposite sides of the seam-cleft, means for supporting the tube in contact with the electrodes including a pair of side pressure rolls having complemental grooves adapted to engage the tube in supporting relation thereto, and means for varying the position of said rolls in the direction of movement of the tube.

12. In apparatus for electrically welding tubing, the combination with tube-traversing and seam-guiding means, of a pair of electrodes adapted to make contact with the tube upon respectively opposite sides of the seam-cleft, means for supporting the tube in contact with the electrodes including a pair of side pressure rolls having complemental grooves adapted to engage the tube in supporting relation thereto, means for varying the position of said rolls in the direction of movement of the tube, and means for moving said rolls toward and from each other transversely to the movement of the tube.

13. In apparatus for electrically welding tubing, the combination with tube-traversing and seam-guiding means, of a pair of electrodes adapted to make contact with the tube upon respectively opposite sides of the seam-cleft, means for supporting the tube in contact with the electrodes including a pair of side pressure rolls having complemental grooves adapted to engage the tube in supporting relation thereto, means for varying the position of said rolls in the direction of movement of the tube, means for moving said rolls toward and from each other transversely to the movement of the tube, and means for moving said rolls simultaneously in the same direction transversely to the movement of the tube.

14. In apparatus for electrically welding tubing, the combination with tube-traversing and seam-guiding means, of a pair of electrodes adapted to make contact with the tube upon respectively opposite sides of the seam-cleft, means for supporting the tube in contact with the electrodes including a pair of side pressure rolls having complemental grooves adapted to engage the tube in supporting relation thereto, and means for simultaneously moving both of said rolls toward and from each other transversely to the movement of the tube without disturbing the adjustment of the electrodes.

15. In apparatus for electrically welding tubing, the combination with tube-traversing and seam-guiding means, of a pair of electrodes adapted to make contact with the tube upon respectively opposite sides of the seam-cleft, means for supporting the tube in contact with the electrodes including a pair of side pressure rolls having complemental grooves adapted to engage the tube in supporting relation thereto, and means for moving said rolls simultaneously in the same direction transversely to the movement of the tube.

16. In apparatus for electrically welding tubing, the combination with tube-traversing and seam-guiding means, of a pair of electrodes adapted to make contact with the tube upon respectively opposite sides of the seam-cleft, means for supporting the tube in contact with the electrodes including a pair of side pressure rolls having complemental grooves adapted to engage the tube in supporting relation thereto, means for moving said rolls toward and from each other transversely to the movement of the tube, and means for moving said rolls simultaneously in the same direction transversely to the movement of the tube.

17. In a welding machine, a seam guiding device comprising a roll having an annular peripheral fin adapted to enter the seam cleft of the tube, a second roll adapted to engage the side of the tube opposite said first named roll and support the tube in contact therewith and with said fin between the opposite adges of the seam-cleft, a rocking housing for supporting said rolls said housing having an open sided aperture adapted to permit the passage of the tube therethrough, a support for said housing, means for adjusting said housing in said support circumferentially around said tube, said first named roll being removably supported in said housing to permit its removal therefrom in a direction radial to said tube.

18. In apparatus of the class described, a frame, a transformer adjustably supported for vertical movements upon said frame, electrodes mounted upon said transformer adapted to contact with work below said transformer, and means mounted on said frame for adjustably raising and lowering said transformer and said electrodes to vary the contact pressure between said electrodes and the work.

19. In apparatus of the class described, a transformer having a one-piece, integral secondary provided with downwardly extending terminals, a pair of revoluble electrodes supported in bearings in said terminals, said electrodes and said terminals having oppositely presented contact surfaces, and brush means interposed between said oppositely presented surfaces and making contact therewith for conducting current from said terminals to said electrodes.

20. In apparatus of the class described, the combination with a transformer and means for supporting it above the work in adjustable relation thereto, said transformer having a one-piece secondary and integral downwardly extending terminals, of a pair of revoluble electrodes supported between said terminals, said electrodes being mounted upon but insulated from a shaft and secured thereto for synchronous rotation therewith, and bearings for said shaft carried by said terminals.

21. In apparatus of the class described, the combination with a transformer and means for supporting it above the work in adjustable relation thereto, said transformer having a one-piece secondary and integral downwardly extending terminals, of a pair of revoluble electrodes supported between said terminals said electrodes being mounted upon but insulated from a shaft and secured thereto for synchronous rotation therewith, bearings for said shaft carried by said terminals, and means for adjusting the position of said shaft and said electrodes transversely to the plane of rotation thereof.

22. In apparatus of the class described, the combination with a supporting frame and means for supporting and longitudinally traversing a tube above said frame, of a transformer adjustably supported on said frame above said tube, said transformer having a one piece integral secondary with downwardly extending terminals, revoluble electrodes supported in bearings by said terminals in insulated relation thereto and to each other, brush means for conducting current from said terminals to said electrodes, said terminals having a cooling fluid jacket compartment, and means for circulating a cooling fluid through said compartment.

23. In electric seam welding apparatus, an electrode structure comprising a revoluble shaft, a pair of hubs mounted on said shaft and insulated therefrom for rotation therewith, said hubs being also insulated from each other, and a pair of electrodes respectively, detachably secured to said hubs in spaced apart relation to each other, said shaft extending outwardly beyond said hubs to form bearing supports for said electrode structure.

24. In apparatus of the class described, the combination with a frame having vertically extending guides, of a transformer adjustably mounted on said guides, said transformer having downwardly extending terminals from its secondary coils, revoluble electrodes supported in bearings by said terminals, work supporting means mounted on said frame below said electrodes, said work supporting means comprising a member of non-magnetic material carried by said frame and means for traversing work between said electrodes and said member.

25. In an electric seam-welding machine of the class described, the combination with a frame having vertically extending guides, of a transformer housing adjustably mounted on said guides adapted to support the core and windings of a transformer, and means for adjusting the position of said core and windings in said housing.

26. In an electric seam-welding machine, the combination with a frame having vertically extending guides, of a transformer housing adjustably mounted on said guides, a transformer supported in said housing, said transformer having downwardly extending terminals, a pair of electrodes supported by said terminals and adapted when properly aligned to make contact with the work upon respectively opposite sides of the seam being welded, and means for adjusting the position of said transformer in said housing to align said electrodes as described.

27. In apparatus for welding tubing, the combination with tube-traversing means, of means for progressively heating the edges of the seam-cleft of the tube at one place in the path of its movement, adjustable compressing means for compressing the tube circumferentially in the plane of said place whereby the seam-cleft is welded, and a pair of pressure rolls adapted to engage the welded tube at a point removed from but closely adjacent to said place in the direction of movement of the tube, and means independent of said adjustable compressing means for varying the pressure of said rolls upon the tube.

28. In apparatus for electrically welding tubing, the combination with tube traversing means, of a pair of electrodes adapted to make contact with the tube upon repectively opposite sides of the seam-cleft, tube supporting and guiding means for supporting the tube in contact with the electrodes, said tube supporting and guiding means having a groove adapted to contact with the tube throughout substantially all of that portion of the tube circumference not encompassed by said electrodes, said electrodes and said tube supporting and guiding means being freely spaced from each other and their grooves together forming a welding throat, and means for simultaneously adjusting in the same direction transversely of said electrodes the parts of said tube supporting and guiding means in which said groove is formed.

29. In apparatus for electrically welding tubing, the combination with tube-traversing means, of a pair of electrodes adapted to make contact with the tube upon respectively opposite sides of the seam-cleft, means for supporting the tube in contact with the electrodes, said tube supporting means being adapted to engage the tube upon both sides of the axial plane of the tube that passes through the seam-cleft, and means for simultaneously adjusting both sides of said tube supporting means in the same direction transversely of said electrodes.

30. In a tube welding machine, a seam guiding device comprising a rocking member co-axial with the tube stock, a support for said rocking member, said rocking member having an open-sided aperture co-axial with the tube stock, means detachably secured to said rocking member closing the open side of said aperture, and a guiding fin carried by said last-named means adapted to enter the seam between the edges of the tube stock.

31. In a tube welding machine, a seam guiding device comprising a rocking member co-axial with the tube stock, a support therefor, means for rotatably adjusting said rocking member about its axis in said support, said rocking member comprising two parts, one part having an open-sided aperture co-axial with the tube stock and the other part forming a removable closure for the open side of said aperture, and a guiding fin carried by said last-named member adapted to enter the seam between the edges of the tube stock.

32. In an electric tube welding machine, the combination comprising tube-stock guiding means consisting of a rocking member co-axial with the tube stock, a support for said rocking member, means to adjust the alinement of said rocking member in said support, spaced sets of tube engaging rollers, and a roller in each set provided with a guiding fin.

33. In an electric tube welding machine, the combination comprising tube-stock guiding means consisting of a rocking member co-axial with the tube-stock, a support for said rocking member, means to adjust the alinement of said rocking member in said support, spaced sets of tube engaging rollers, one of the rollers being separable, and a removable guiding fin held centrally in the separable roller.

34. The method of progressive electric butt seam welding which comprises applying current-delivering, adjustable-pressure electrodes to contact areas on each side of the work seam to be welded, effecting relative movement between the electrodes and the work, pressing the seam edges together at the welding point and co-ordinating the variable factors of the circuit that are localized within a small area including the welding point by selectively controlling the movement of the otherwise uniformly applied electrodes towards or from the work.

35. The method of progressive electric butt seam welding which comprises supplying welding current to a circuit including the seam to be welded and co-ordinating the variable factors of the circuit that are localized within a small area including the welding point by selectively controlling the otherwise uniformly applied pressure of the electrodes upon the work.

36. The method of high-speed progressive butt seam welding which comprises supplying welding current to a circuit including the seam to be welded in rapidly moving work and co-ordinating the variable factors of the circuit that are localized within a small area including the welding point by selectively varying the otherwise uniformly applied pressure of the electrodes upon the work.

37. The method of high-speed progressive electric butt tube welding, which comprises supplying welding current to a circuit including a rapidly moving tube-form containing a seam to be welded, and co-ordinating the variable factors of the circuit that are localized within a small area including the welding point by selectively varying the pressure otherwise uniformly applied of the electrodes upon the tube-form.

38. The method of continuous electric butt-seam welding, which comprises passing skelp through a welding throat and introducing variations in the area of the welding throat during the welding operation to maintain the application of substantially uniform effective welding heat and pressure between the contacting edges of the skelp seam-cleft as said skelp passes through the welding throat.

39. The method of continuous electric butt-seam welding, which comprises passing skelp through a welding throat and introducing variations in the pressure exerted by the welding throat upon the skelp during the welding operation to compensate for the variations in the strength of the welding current caused by variations in dimensions and character of the skelp.

40. The method of continuous electric butt-seam tube welding which comprises passing skelp through a welding throat, causing a constant potential electric welding circuit to be closed across the butted seam-cleft to be welded, and selectively varying the pressure of the electrodes upon the work to maintain the application of substantially uniform effective welding heat and pressure between the contacting edges of the seam-cleft as said skelp passes through the welding throat.

41. In an electric tube welding machine, the combination of tube supporting and positioning roll means adjustably movable transversely of the tube axis, a transformer, electrodes carried thereby and adapted to engage the top of a tube respectively on opposite sides of the seam cleft, the electrodes and transformer being adjustably movable in a vertical plane, adjusting means for moving the said roll means transversely of the tube axis and of the plane of rotation of the electrodes independently of the electrodes, and adjusting means for moving the transformer and electrodes in a vertical plane to vary selectively the otherwise uniform contact pressure between the tube and electrodes.

42. In an electric tube welding machine, the combination of a pair of tube supporting and positioning side pressure grooved rolls adjustably movable transversely of the tube axis, a transformer, electrodes carried thereby and adapted to engage the top of a tube respectively on opposite sides of the seam cleft, the electrodes and transformer being adjustably movable in a vertical plane, adjusting means for moving the said grooved rolls transversely of the tube axis and of the plane of rotation of the electrodes independently of the electrodes, and adjusting means for moving the transformer and electrodes in a vertical plane to vary selectively the otherwise uniform contact pressure between the tube and electrodes.

43. In an electric tube welding machine, the combination of roll means for supporting a tube to be welded with the seam cleft uppermost, rotatable electrodes adapted to contact respectively with the tube on opposite sides of the seam cleft, and means for selectively varying the otherwise uniformly applied contact pressure between the tube and electrodes, said means including a transformer carrying the electrodes and mounted for raising and lowering movement in a vertical plane in directions away from or toward the tube respectively, and positive selectively adjustable means for positively raising the transformer and electrodes and for permitting lowering movement of the same.

44. In a progressive electric butt seam welding machine, the combination of means for supporting work to be welded, rotatable electrodes adapted to contact respectively with the top of the work on opposite sides of the seam cleft, and means for selectively varying the otherwise uniformly applied contact pressure between the work and electrodes, said means including a transformer carrying the electrodes and mounted for raising and lowering movements in a vertical plane in directions away from or toward the work, respectively, and positive selectively adjustable means for positively raising the transformer and electrodes and for permitting lowering movement of the same.

45. In appartus for electric butt seam welding, roll means for supporting thereon work to be welded, rotatable electrodes contacting with the top surface of the work on opposite sides respectively of the seam cleft, and means for varying the pressure between the electrodes and work, said means including a transformer carrying the electrodes, and selectively adjustable means for moving the transformer and electrodes in a vertical plane in directions toward or away from the work and thereby varying the portion of the weight of the transformer and electrodes borne by the work.

46. In apparatus for electrically welding tubing, the combination of tube traversing means, a pair of electrodes adapted to make contact with the tube upon respectively opposite sides of the seam cleft, means for supporting the tube in contact with the electrodes, said tube supporting means being adapted to engage the tube on both sides of the axial plane of the tube which passes through the seam cleft, and means for simultaneously adjusting both sides of said tube supporting means in the same direction transversely of said electrodes independently of said electrodes.

47. In apparatus for electrically welding tubing, the combination with tube traversing means, of a pair of electrodes adapted to make contact with the tube upon respectively opposite sides of the seam cleft, means for supporting the tube in contact with the electrodes, said tube supporting means being adapted to engage the tube upon both sides of the axial plane of the tube that passes through the seam cleft, means for simultaneously adjusting both sides of said tube supporting means in the same direction transversely of said electrodes, and means for adjusting the electrodes in a direction transversely of the plane of rotation of the electrodes independently of the tube supporting means.

48. In apparatus for electrically welding tubing, the combination of tube traversing means, a pair of electrodes adapted to make contact with the tube upon respectively opposite sides of the seam cleft, means for supporting the tube in contact with the electrodes, said tube supporting means being adapted to engage the tube on both sides of the axial plane of the tube which passes through the seam cleft, and means for simultaneously adjusting both sides of said tube supporting means in the same direction transversely of said electrodes independently of said electrodes, said adjusting means being operable for effecting the said adjustment while the tube is moving through the apparatus.

49. In apparatus for electrically welding tubing, the combination with tube traversing means, of a pair of electrodes adapted to make contact with the tube upon respectively opposite sides of the seam cleft, means for supporting the tube in contact with the electrodes, said tube supporting means being adapted to engage the tube upon both sides of the axial plane of the tube that passes through the seam cleft, means for simultaneously adjusting both sides of said tube supporting means in the same direction transversely of said electrodes, and means for adjusting the electrodes in a direction transversely of the plane of rotation of the electrodes independently of the tube supporting means, said adjusting means being operable for effecting the said adjustments while the tube is moving through the apparatus.

50. In apparatus for electrically welding tubing, the combination of tube traversing means, of a pair of electrodes adapted to make contact with the tube upon respectively opposite sides of the seam cleft, means for supporting the tube in contact with the electrodes, said tube supporting means being adapted to engage the tube upon both sides of the axial plane of the tube that passes through the seam cleft, and means for simultaneously adjusting both electrodes in the same direction transversely of the plane of rotation thereof independently of said tube supporting means.

51. In apparatus for electrically welding tubing, the combination of tube traversing means, of a pair of electrodes, adapted to make contact with the tube upon respectively opposite sides of the seam cleft, means for supporting the tube in contact with the electrodes, said tube supporting means being adapted to engage the tube upon both sides of the axial plane of the tube that passes through the seam cleft, and means for simultaneously adjusting both electrodes in the same direction transversely of the plane of rotation thereof independently of said tube supporting means, said adjusting means being operable for effecting the said adjustment while the electrodes are rotating.

FRANK L. SESSIONS.

CERTIFICATE OF CORRECTION.

Patent No. 1,722,711.                      Granted July 30, 1929, to

FRANK L. SESSIONS.

It is hereby certified that error appears in the above numbered patent requiring correction as follows: In the heading to the printed specification line 5, for Serial Number "500,884" read "590,884"; and that the said Letters Patent should be read with this correction therein that the same may conform to the record of the case in the Patent Office.

Signed and sealed this 1st day of October, A. D. 1929.

(Seal)                                            M. J. Moore,
                                                 Acting Commissioner of Patents.